United States Patent [19]

Kittle

[11] Patent Number: 4,990,373
[45] Date of Patent: Feb. 5, 1991

[54] MEMBRANE-FORMING FOAM COMPOSITION AND METHOD

[75] Inventor: Paul A. Kittle, West Chester, Pa.

[73] Assignee: Rusmar Incorporated, West Chester, Pa.

[21] Appl. No.: 414,687

[22] Filed: Sep. 29, 1989

[51] Int. Cl.$^5$ .......................... B05D 5/00; B05D 5/10; B05C 1/16; E01C 5/00

[52] U.S. Cl. .................... 427/244; 427/136; 106/122; 106/900; 252/321; 252/307; 521/65; 521/88; 521/89

[58] Field of Search .............. 427/136, 244, 421; 106/122, 900; 252/321; 521/65, 88, 89

[56] References Cited

U.S. PATENT DOCUMENTS

| | | | |
|---|---|---|---|
| 2,945,322 | 7/1960 | Gaeth et al. | 47/9 |
| 3,466,873 | 9/1969 | Present | 405/128 |
| 3,954,662 | 5/1976 | Salyer et al. | 118/305 |
| 4,004,049 | 1/1977 | Horwat et al. | 427/421 |
| 4,421,788 | 12/1983 | Kramer | 427/136 |
| 4,519,338 | 5/1985 | Kramer | 118/305 |
| 4,874,641 | 10/1989 | Kittle | 427/136 |

Primary Examiner—Michael Lusignan
Assistant Examiner—Diana L. Dudash
Attorney, Agent, or Firm—Howson & Howson

[57] ABSTRACT

An aqueous foamable membrane-forming composition comprised of a water dispersible polymeric latex, preferably styrene-butadiene latex, and an alkyl ether sulfate surface active agent. The composition desirably contains a alcohol having 12 to 14 carbon atoms, an acrylic acid polymer viscosity modifying agent and powdered carbon. Compositions of the invention in dilute aqueous form can be foamed and deposited on a surface to be covered, such as a landfill. Upon standing, the foam develops into a substantially stable, weather resistent membrane.

17 Claims, No Drawings

MEMBRANE-FORMING FOAM COMPOSITION AND METHOD

FIELD OF THE INVENTION

This invention relates to a barrier formed on a surface, such as a layer of waste deposited in a landfill and, more particularly, to a composition of, and method for forming, such a barrier.

BACKGROUND OF THE INVENTION

The disposal of trash, garbage, sewage treatment sludge, industrial wastes, etc. has long been a problem in this country and likely will not be one which is solved satisfactorily in the very near future. While the incineration of such wastes to generate power continues to be a major approach to disposal, such methods have been on the decline due to the strict enforcement of air pollution laws. Thus, a proliferation of landfill operations, especially in urbanized areas, has been experienced in recent years. However, with increasing suburban population densities and stringent state and federal regulations regarding the ecology, landfill operators have had to endure generally accelerating costs.

A traditional landfill operation involves dumping the wastes into a natural or artificial cavity in the earth, leveling, compacting and/or treating the wastes, spreading a layer of earth or soil over the top surface of the wastes, essentially to prevent the escape of odors and fumes, and then continuing the landfilling with successive layers of refuse and soil until the site is filled. Typical of such operations are those shown in U.S. Pat. Nos. 3,614,867 to Nieman and 3,732,697 to Dickson.

It has been suggested to replace the earthen covering over compacted wastes with a foamed plastic layer to eliminate the expense of transporting fill dirt to the site and operating large earth moving equipment to spread and compact it as well as the consumption of significant volumes of the landfill site with non-waste material (i.e., soil) to the detriment of the operator. One of such advances is described in U.S. Pat. No. 3,466,873 to Present wherein successive layers of refuse are covered with foamed polyurethane-, polyether- or polyester-based plastic resins to provide a rigid cellular structure impervious to gas or water over each layer of refuse. U.S. Pat. Nos. 4,421,788 and 4,519,338 to Kramer et al. also teach sealing a landfill with a hardenable foam cover of a liquid synthetic resin, such as a precondensate of urea and formaldehyde, which hardens and cures very soon after it is deposited.

The need has arisen for an improved and relatively inexpensive, long duration barrier layer for application to a surface, such as a landfill, which insulates the surface from the environment and which can also provide odor control, lack of substantial filling volume, and safety to the ecology.

OBJECTS OF THE INVENTION

It is an object of this invention to provide a novel composition which can be applied to a surface such as the surface of an operating landfill, as a membrane-forming foam layer to create a barrier between the surface and the ambient air.

It is another object of this invention to provide a novel composition in concentrate form which can be mixed with water at a site and applied to the surface as a membrane-forming foam layer to create a barrier between the surface and the ambient air.

It is another object of the present invention to provide a novel method of forming a barrier between a layer of waste deposited in a landfill and the ambient air.

Further objects of this invention will become apparent from the following description and the appended claims.

SUMMARY OF THE INVENTION

According to the invention, a membrane-forming foamable composition is provided which comprises a polymer in latex form which has a low glass transition temperature and has the ability to form flexible films at or below room temperature and an anionic sulfate or sulfonate surfactant selected from compounds having the formula

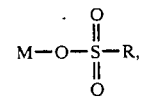

compounds having the formula

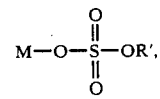

and mixtures of these, wherein M is a monovalent cation selected from sodium, potassium, lithium, ammonium or alkyl-substituted ammonium, R is an alkyl, alkenyl or alkaryl group having 10 to 20 carbon atoms and R' is an alkyl, alkenyl or alkaryl group having 10 to 20 carbon atoms or an alkylether group having the structure

wherein R'' is an alkyl group containing 10–20 carbon atoms, R''' is H or an alkyl group having up to 4 carbon atoms and n is an integer from 1 to 12. The foam forming composition optionally contains an alkanol having about 10 to 18 carbon atoms, an acrylic polymer viscosity modifier, powdered carbon and a swelling agent.

The polymeric latex is preferably a styrene-butadiene latex having a glass transition temperature in the range of about $+30°$ C. to $-80°$ C. The preferred surfactants are the alkyl ether sulfates having 12 to 14 alkyl carbon atoms and 3 to 12 oxyethylene units. Preferred alcohols are the straight chained alkanols having 12 to 14 carbon atoms. Preferred viscosity modifiers are acrylic acid polymers having glass transition temperatures of about $0°$ C. to $-50°$ C. The preferred swelling agent is 2,2,4-trimethyl-1,3-pentanediol monoisobutyrate.

The foamable composition of the invention is applied to a substrate, such as a waste containing landfill, by foaming the composition in suitable equipment and applying a layer of the foam onto the substrate to be covered. In a short period of time the foamed compositions forms a membrane having a continuous structure.

DETAILED DESCRIPTION

The membrane-forming foamable compositions of this invention comprise, as essential ingredients, a polymeric latex having a glass transition temperature not greater than about +30° C. and generally in the range of about +30° C. to about −80° C. and characterized by its ability to form a flexible film at room temperature, an anionic surfactant which is a very strong foaming agent capable of working at low concentrations in cold water with relatively high hardness and/or solids concentrations, and water. When dispersed in water at from about 5 to 25% by weight solids, i.e. components other than water, and agitated to initiate foaming, these components deliver to a surface a latex foam which ultimately drains, ideally at approximately the same rate as the latex coagulates, to form a film-like structure. The latex has an adhesive character as it drains so that it sticks to the surfaces it contacts. Moreover, the low glass transition temperature of the resulting film or membrane allows it to span or be stretched over any irregular surfaces or objects it encounters on the surface being covered.

Almost any latex formulation can be employed in this invention so long as it is capable of film forming at room temperature. A low glass transition temperature (Tg) is desired for film forming at room temperature, as well as for final film flexibility. In general, as the Tg decreases, the film forming performance of the latex at low temperatures improves. Additionally, with decreasing Tg the flexibility of the film improves so that it is able to stretch over discontinuities or voids in the substrate being coated, thereby forming a continuous membrane. As the Tg increases, the resulting film gradually becomes stiffer and more rigid, ultimately yielding a membrane which cracks as it dries.

Due to their relatively low cost, low Tg aqueous styrene-butadiene latex formulations are particularly well suited for the practice of this invention. One such formulation is a product sold by the Dow Chemical Company of Midland, Mich. under the designation DL236NA. This latex is supplied as a 50% by weight solids dispersion in water and has a Tg of −44° C. Other aqueous latices which can be used in whole or in part for the latex component of this invention include vinyl acetate polymers, acrylic ester polymers, such as polyethylacrylate, polyacrylonitrile, etc.

The concentration of the latex in the film-forming foamable compositions of this invention is generally in the range of about 10 to 40% by weight, based on a latex formulation consisting of 50% solids. This is the equivalent of about 5 to about 20% by weight of polymer. At the 10% concentration level (5% solids), the resulting film will be continuous but somewhat porous. At concentrations lower than this minimum level, the resulting film will be weak and tend to develop voids. Concentrations of about 40% by weight latex (i.e., 20% solids) will yield films that are very rubber-like. In view of the higher costs associated with upper concentration levels, the latex is preferably incorporated in the foam forming composition of this invention at a concentration within the range of 10 to 30% by weight, which is equivalent to a solids content of about to 15% by weight.

The surfactant, as indicated above, must be capable of foaming at low temperatures and in the presence of an insoluble phase, i.e., latex particles, etc. The anionic surfactant used in the composition of the invention may be any water-soluble anionic sulfonate or sulfate surfactant which when mixed with water can be converted into foam. Sulfonates and sulfates are specified because of their excellent foam producing qualities, low cost and ready availability.

Sulfonates preferred for use in the invention are those having the structural formula:

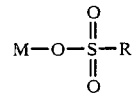

where M is a monovalent cation and R is a hydrocarbon radical selected from alkyl, alkenyl and alkaryl radicals.

M may be an alkali metal ion, the ammonium ion or alkyl-substituted or hydroxyalkyl-substituted ammonium. When M is an alkali metal it is preferably sodium, potassium or lithium. When M is an alkyl or hydroxyalkyl group-substituted ammonium, it generally has up to six, and preferably up to 3 carbon atoms. Preferred alkyl groups include methyl, ethyl, isopropyl, etc. radicals. Preferred hydroxyalkyl groups include hydroxyethyl, hydroxypropyl, etc. radicals. Examples of preferred substituted ammonium radicals are mono-, di- and tri-alkyl ammonium radicals containing 1-3 carbon atoms in each substituent group, and mono-,di- and trialkanolammonium groups having 2-3 carbon atoms in each substituent. Particularly preferred substituted ammonium groups are mono-, di- and triethanolammonium radicals.

R is generally an alkyl, alkenyl or alkaryl radical having 10-20 carbon atoms. Typical R substituents include alkyls, such as decyl, dodecyl, tetradecyl, hexadecyl, octadecyl, etc.; alkenyl groups, such as 1-dodecenyl, 1-tetradecenyl, 2-hexadecenyl, etc.; and alkaryl groups such as dodecylbenzenene, isopropylnaphthalene, etc.

Sulfonate surfactants which are desirable for use in the invention include potassium dodecyl sulfonate, sodium 1-dodecenyl sulfonate, sodium dodecylbenzenene sulfonate, ammonium isopropylnapthalene sulfonate etc. The preferred sulfonate for use in the invention is sodium alpha-olefin sulfonate, a mixture comprised substantially of $C_{12}$ and $C_{14}$ alpha-olefin radicals. This compound has been found to produce stiff and slow-draining foams.

Sulfates suitable for use in the invention are those having the structural formula:

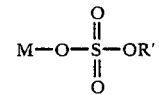

where M is as defined above and R' is an alkyl, alkenyl, alkaryl or an alkylpolyether radicals. Where R' is an alkylpolyether group it has the structure:

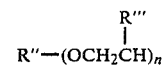

wherein R" is an alkyl group containing 10-20, and preferably 12-16 carbon atoms, R'" is H or an alkyl group containing up to 3 carbon atoms and n is an integer of 1-12. R'" is preferably H or the methyl radical and n is preferably 3-6.

Alkenyl groups, suitable as R' constituents include 1-dodecenyl, 1-tetradecenyl, 2-hexadecenyl, etc. Suitable alkaryl groups include dodecylbenzene, isopropylnaphthalene, hexadecyltetraethoxy, etc.

Sulfate surfactants which are desirable for use in the invention include alkyl sulfates, such as sodium lauryl sulfate; alkenyl sulfates, such as potassium 1-dodecenyl sulfate; alkaryl sulfates, such as ammonium dodecylbenzene sulfate; and alkylpolyether sulfates, such as sodium octodecyltetraethoxy sulfate. The preferred sulfates are the alkylpolyether sulfates.

Mixed sulfonates and/or sulfates, i.e. mixtures of sulfonates or mixtures of sulfates or mixtures of sulfonates and sulfates having different substituents may also be used in the invention.

For some applications, it may be desired to use sulfonates and/or sulfates having, as the R or R' substituent, a heteroatom-containing radical. In addition to carbon and hydrogen atoms, oxygen may be present in the form of carboxyl, ester or ether groups.

The ammonium neutralized surfactants are preferred because the ammonia is dispelled upon exposure to air, leaving behind an acid function which increases the coagulation rate of a latex.

A preferred surfactant is the ammonium salt of a $C_{14}$ alkylether sulfate, sold by the Stepan Company of Northfield, Ill., under the designation Stepanol CA-207. It is supplied as a 60% solution in water and alcohol. It is a very strong foaming agent capable of working at low concentrations in cold water with high hardness and/or solids.

The useful concentration of the surfactant component of the membrane-forming foam compositions of this invention depends upon the capacity of the surfactant to foam and carry the associated non-foaming materials in the composition. In the case of Stepanol CA-207 and related surfactants, a concentration range of from 0.5 to 0.8 weight percent actives is appropriate. At lower concentrations, the foaming performance declines, particularly at low temperatures; higher concentrations only increase the hydrophilic species present in the film-forming composition and therefore slow the drying rate of the foam. Higher concentrations, of course, disadvantageously affect the cost of the compositions.

The balance of the membrane-forming foam composition is water. Sufficient water should be combined with the latex and surfactant components to provide a dispersion containing from about 5 to 25% by weight solids. The diluted composition may then be agitated or otherwise mixed with air to generate the foam to be deposited on the landfill. Pneumatic or other types of foaming machinery are available.

In accordance with another aspect of this invention, the formulation may be prepared as a concentrate by limiting the amount of water added. The concentrate can, consequently, be diluted on site thereby saving the landfill operator the additional expense of transporting very large volumes of liquid to such operations. Depending on the latex formulation, the concentrate may contain up to about 60% by weight solids.

In order to improve the generation and retention of the foam on the surface being treated supplementary or secondary ingredients may be incorporated in the foam composition of this invention. Such optional ingredients include rheology and viscosity modifiers, coagulation aids, nucleation agents, coalescing aids, pH modifiers, swelling agents, fillers and pigments.

For example, from 0 to 1.0% by weight of one or more long chain alcohols of from 10 to 18 carbon atoms may be added to the membrane-forming foamable composition. Such additions have been found to improve the drain time of the foam but they also demonstrate cosurfactant functions.

These higher alcohols are waxy solids having relatively high melting points and are generally insoluble and immiscible in water. Thus, they have a natural water-repelling characteristic which becomes beneficial after the foam is deposited onto the surface. Prior to foaming, however, low levels of such alcohols become dissolved by the surfactant solution. Their solution support decreases once the composition is foamed yielding an insoluble wax-like substance which joins in the initial film-forming step.

The long chain alcohol component is preferably a $C_{12}$ or $C_{14}$ alcohol or a mixture of the same. One such alcohol is n-tetradecanol which is sold under the designation Alfol-14 by Vista Chemical Company The $C_{10}$, $C_{16}$, and $C_{18}$ alcohols are usable in the practice of the invention, but do not work as well as the $C_{12}$ and $C_{14}$ analogs. The alcohols of shorter chain length have demonstrated no beneficial effect in improving the drain time of the foam and the longer ones have even more limited solubility plus no extra benefit.

Optimum levels of the alcohol(s) are about equimolar to about 1.5 molar with respect to the surfactant. Consequently, the preferred concentration of the long chain alcohol in the foam composition of this invention is about 0.5% by weight. In general alcohol concentrations higher than the above-noted 1% by weight can not be supported by the composition and alcohol concentrations below about 0.38% by weight cause weakness in the final film.

One or more viscosity or rheology modifiers may be combined with the essential ingredients of the invention. For instance, such modifiers may provide high foam viscosity, allowing for reduced drain time at summertime temperatures and good adhesion to steep slopes or, alternatively, reduced foam viscosity, with consequent faster drying times at freezing temperatures. Of course, depending on specific circumstances, these high and low temperature applications can be moderated by combinations of such modifiers.

Ideally, the viscosity modifiers should be water soluble for the preparation of the foam composition and then become insoluble as the latex coagulates. In the preferred embodiment the modifier is soluble in the alkaline medium provided by the ammonium-based surfactant and any additional basic additives present in the foam composition. After foaming, the air loss of ammonia causes the pH of the foam layer to gradually drop to the acidic range with the result that the foam forms a skin constituted by the precipitated modifier and the associated latex particles in conjunction with the optional waxy alcohol, if present. This will occur within a few minutes at comfortable temperatures and an hour or so at freezing temperatures.

The preferred viscosity modifiers are acrylic acid polymer emulsions, such as those manufactured by Rohm and Haas Company of Philadelphia, Pa. Under the designations Acrysol TT-935 and Acrysol ICS-1. These polymers have low glass transition temperatures (Tg) and are film formers at room temperature or below. They are supplied as 30% acidic emulsions which increase in viscosity as the pH increases, as with the addition of a base such as NaOH, KOH, $NH_4OH$, amines, etc. Such emulsions as these have been used conventionally in latex paints as rheology modifiers and coating formulations prepared with them exhibit excellent smoothing and leveling properties.

When used in the formulation of the invention about 1.0% to 1.5% by weight of the viscosity modifier(s) is desired, but about 1.15 to 1.35% by weight is preferred. Skinning of the foam is very slow for additions of about 1.0% and additions over 1.5% by weight only increase the viscosity and costs. When present in the foam composition in combination with the long chain alcohol detailed above, drain time control is further improved beyond that achievable with either component alone.

Ammonium hydroxide or related alkaline bases may also be added to the novel compositions to maintain or adjust the pH of the foam to a level in the range of about 7.5 to about 9. At the same time, such base addition neutralizes the acidic function of the viscosity modifier, if present. Ammonium hydroxide is preferred because it is a fugitive base leaving no trace upon exposure to air.

Carbon powder may be included in the composition to provide a black to dark gray tint to the foam so that it absorbs light and heat, thereby speeding the rate of ammonia discharge and the evaporation of surface water. This property is very desirable for cold weather applications. In latex formulations having in the vicinity of 5 to 10% by weight polymer solids, the carbon addition also acts as a hydrophobic filler or extender and as a nucleating agent for the latex, resulting in a more continuous membrane. Without carbon, the latex tends to coagulate on itself yielding a latex net as opposed to a film.

When carbon is to be added, its concentration range is generally in the range of about 0.5 to about 2.0% by weight. Below about 0.5% by weight at low latex solids concentrations, film forming is difficult. At concentrations between 1.5 and 2.0% by weight carbon at the higher latex solids concentrations, foaming is negatively affected at the optimum surfactant levels, meaning that more surfactant is required to provide a satisfactory foam. Within the evaluation criteria available, about 0.5 to 1.5% by weight carbon is preferred.

A swelling agent for the latex polymer may optionally be introduced into the composition for the purpose of encouraging film formation at lower than normal temperatures. When present, it is absorbed by the particles of the latex allowing them to coagulate more quickly. The preferred swelling agent for the practice of this invention is 2,2,4-trimethyl-1,3-pentanediol monoisobutyrate.

When used, the level of the swelling agent in the foam composition is generally defined by the amount of latex solids in the composition. The maximum quantity used is the quantity that the latex solids can absorb. This is generally about 12% by weight based on the latex solids. Any unabsorbed excess beyond that level becomes a secondary phase in the composition causing general failure of the foam structure. However, diminishing the level of swelling agent below about 11.5% by weight based on the latex solids detracts from the skinning rate of the latex foam, especially at the lower temperatures experienced in the winter season. Generally, concentrations ranging from about 0.5 to about 2.0% by weight based on the weight of the foam composition are preferred for use in the invention.

The concentrates capable of being formulated according to this invention depend upon many of the compositional variables described above, specifically with respect to the weight percent of latex solids and the level of the optional viscosity modifiers. The concentrate should not be so viscous that it becomes unstable or that it will not be properly and efficiently diluted with water at the time of use. Concentrates having viscosities below 10,000 cps. are preferred.

Although a principal use of the membrane-forming foam compositions of the invention is in landfill operations, they are also useful in various other operations, such as in long term fugitive dust control, odor control on both liquid and solid substrates, and as a mulch-like covering in the landscaping industries.

The following examples illustrate specific embodiments of the invention. Unless otherwise indicated parts and percentages expressed in the examples are on a weight basis.

EXAMPLE 1

The following ingredients were used to prepare a foamable membrane-forming composition according to this invention:

| Ingredient | % by Weight |
| --- | --- |
| Stephan's CA-207 (60% actives) | 1.10 |
| Dow's DL236NA (50% solids) | 12.00 |
| Vista's Alfol-14 | 0.50 |
| Rohm and Haas' TT-935 (30% solids) | 1.25 |
| Cabot's Sterling R carbon | 1.00 |
| Texanol (2,2,4-trimethyl-1,3-pentanediol monoisobutyrate) | 0.70 |
| Ammonium hydroxide (25%) | 0.20 |
| Water (hot) | 83.25 |

The CA-207, Alfol-14, TT-935 and carbon powder ingredients were first combined with the hot water and then circulated by means of a gear pump to evenly disperse the carbon. The water used initially in the preparation is heated so that the long chain alcohol (Alfol-14) can be melted. The ammonium hydroxide is next added to the dispersion, thereby causing a noticeable increase in viscosity. Thereafter, the DL236NA latex is added, followed by the Texanol. If the entire proportion of water was not used in the initial step, the remainder is then combined with the dispersion and the dispersion is next transferred to a suitable apparatus for foaming and application to a layer of refuse in a landfill.

The system is shear sensitive and is best transferred via a diaphragm pump. In this instance, foaming was accomplished by the use of a Rusmar Incorporated pneumatic foam unit. The apparatus produces foam by forcing the foamable mixture through a restricted passage at a very high pressure and injecting air into the mixture downstream of the restriction. The restriction is sufficiently narrow to produce a high velocity flow of the dispersion so that the initiation of foam generation takes place just past the restriction by the flashing of some of the dispersion medium. Continued foam generation takes place in a converging line further downstream of the restricted passage where the air is injected. The foam issuing from the conveying line was sprayed onto the landfill contents by means of a nozzle and was accumulated to a thickness ranging from 2 to about 4 inches. The ambient temperature at the time of spraying was 40 degree F.

The foam was dark gray in color. Within one hour, a skin formed on the surface of the foam due to the dissipation of ammonia from the foam. As time passes, the water content of the foam drained allowing the latex distributed in the foam to coagulate as a multitude of bubble walls laminated in the form of a continuous film or membrane covering the irregular surface of the compacted landfill. The resulting membrane resembled a latex rubber shrink wrapping over the many voids and projections in the landfill. In general, the membrane is non-biodegradable and is limited only by physical damage. Therefore, it is capable of persisting for several months if it is not contacted by heavy loads, such as additional deposits of refuse or the equipment used to handle such deposits.

Although the invention is described with reference to a specific example it is understood that the scope of the invention is not limited thereto but is only limited by the breadth of the appended claims.

I claim:

1. A method of forming a barrier layer between a substrate and the atmosphere which comprises applying to the substrate a foam prepared from an aqueous composition comprising a polymer in latex form having a glass transition temperature below about 30° C. and at least one anionic sulfonate or sulfate surfactant, the weight ratio of polymer to surfactant being in the range of 90:10 to 98:2.

2. The method of claim 1 wherein said polymer is selected from styrene-butadiene copolymers, vinyl acetate polymers, acrylic ester polymers, acrylonitrile polymers, and mixtures thereof.

3. The method of claim 1 wherein said anionic surfactant is selected from compounds having the formula

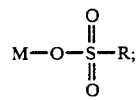

compounds having the formula

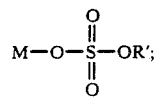

and mixtures thereof, where M is a monovalent cation, R is an alkyl, alkenyl or alkaryl group having 10 to 20 carbon atoms, R' is an alkyl, alkenyl or alkaryl group having 10 to 20 carbon atoms or an alkyl polyether group having the structure $$R''(OCH_2CH)_n \atop R'''$$

where R'' is an alkyl group having 10 to 20 carbon atoms, R''' is H or an alkyl group having up to 4 carbon atoms and n is an integer in the range 1 to 12.

4. The method of claim 1 wherein said polymer is selected from styrene-butadiene copolymers, vinyl acetate polymers, acrylic ester polymers, acrylonitrile polymers, and mixtures thereof, and wherein said anionic surfactant is selected from compounds having the formula

compounds having the formula

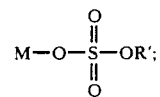

and mixtures thereof, where M is a monovalent cation, R is an alkyl, alkenyl or alkaryl group having 10 to 20 carbon atoms, R' is an alkyl, alkenyl or alkaryl group having 10 to 20 carbon atoms or an alkyl polyether group having the structure $$R''(OCH_2CH)_n \atop R'''$$

where R'' is an alkyl group having 10 to 20 carbon atoms, R''' is H or an alkyl group having up to 4 carbon atoms and n is an integer in the range 1 to 12.

5. The method of claim 4 wherein said polymer is styrene-butadiene copolymer.

6. The method of claim 4 wherein said surfactant is an alkyl polyether sulfate having the formula

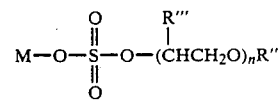

where M is selected from sodium, potassium, lithium, ammonium, alkylammonium, alkanolammonium and mixtures of these, R'' is an alkyl group having 10 to 20 carbon atoms, R''' is H or methyl and n is an integer in the range 1 to 12.

7. The method of claim 6 wherein said polymer is styrene-butadiene copolymer.

8. The method of claim 1 further comprising an alkanol having 10 to 18 carbon atoms.

9. The method of claim 1 further comprising a viscosity modifier.

10. The method of claim 1 wherein said aqueous composition further comprises a swelling agent.

11. The method of claim 4 wherein said aqueous composition further comprises at least one alkanol having 12 to 14 carbon atoms.

12. The method of claim 1 wherein said aqueous composition further comprises an acrylic polymer viscosity modifier.

13. A method of forming a barrier layer between a substrate and the atmosphere which comprises applying to the substrate a foam prepared from an aqueous membrane-forming foamable composition comprising, based on the weight of solids in the aqueous composition:
(a) about 60 to about 90 weight percent of a polymer in latex form selected from styrene-butadiene copolymer, poly(vinyl acetate), acrylic ester polymers, polyacrylonitrile, and mixtures thereof;
(b) about 5 to about 10 weight percent of a water-soluble anionic surfactant selected from compounds having the formula

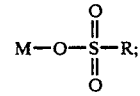

compounds having the formula

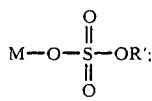

and mixtures thereof, where M is a monovalent cation selected from sodium, potassium, ammonium, alkyl-substituted ammonium, alkanol-substituted ammonium and mixtures thereof, R is an alkyl, alkenyl, or alkaryl group having 10-20 carbon atoms, R' is an alkyl, alkenyl, or alkaryl group having 10-20 carbon atoms or an alkyl polyether having the structure

where R" is an alkyl group having 10 to 20 carbon atoms, R''' is H or the methyl radical and n is an integer in the range 1 to 12;
(c) sufficient base to neutralize the acidic components in the composition and adjust the pH of the composition to a value of at least 7.5;
(d) an alkanol having 12 to 14 carbon atoms, in an amount up to about 10 weight percent;
(e) an acrylic acid polymer viscosity modifier in an amount up to about 10 weight percent;
(f) a swelling agent in an amount up to about 10 weight percent; and
(g) powdered carbon in an amount up to about 20 weight percent.

14. The method of claim 13 wherein the polymer is styrene-butadiene latex.

15. The method of claim 13 wherein the surfactant is an alkylpolyether sulfate having 12-14 alkyl carbon atoms and 3-12 oxyethylene units.

16. A method of forming a barrier layer between a substrate and the atmosphere which comprises applying to the substrate a foam prepared from an aqueous membrane-forming foamable composition comprising, based on the weight of solids in the aqueous composition:
(a) about 60 to about 90 weight percent of styrene-butadiene latex;
(b) about 5 to about 10 weight percent of a water-soluble anionic surfactant having the formula

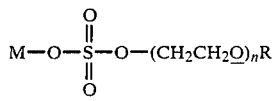

where M is a monovalent cation selected from sodium, potassium, ammonium, alkyl-substituted ammonium, alkanol-substituted ammonium and mixtures thereof, R is an alkyl group having 10-20 carbon atoms, and n is an integer in the range 1-12;
(c) sufficient base to neutralize the acidic components in the composition and adjust the pH of the composition to a value of at least 7.5;
(d) about 0.5 to about 10 weight percent of an alkanol having 12 to 14 carbon atoms;
(e) about 2 to about 10 weight percent of an acrylic acid polymer viscosity modifier;
(f) a swelling agent in an amount up to about 10 weight percent; and
(g) powdered carbon in an amount up to about 20 weight percent.

17. The method of claim 14 wherein the polymer is styrene-butadiene latex and the surfactant is an alkylpolyether sulfate having 12-14 alkyl carbon atoms and 3-12 oxyethylene units.

* * * * *

UNITED STATES PATENT AND TRADEMARK OFFICE
CERTIFICATE OF CORRECTION

PATENT NO. : 4,990,373
DATED : February 5, 1991
INVENTOR(S) : Paul A. Kittle

It is certified that error appears in the above—identified patent and that said Letters Patent is hereby corrected as shown below:

Column 3, line 59, after "about" the number "5%" should be inserted.

Column 6, line 27, after "general" a "," should be inserted.

Signed and Sealed this

Twenty-third Day of April, 1991

Attest:

HARRY F. MANBECK, JR.

*Attesting Officer*          *Commissioner of Patents and Trademarks*